(12) United States Patent
Hartmann et al.

(10) Patent No.: US 9,340,242 B1
(45) Date of Patent: May 17, 2016

(54) ADJUSTABLE KING PIN ASSEMBLY

(71) Applicants: Kelly J. Hartmann, Spencer, IA (US); Brian D. Gosch, Sioux Center, IA (US)

(72) Inventors: Kelly J. Hartmann, Spencer, IA (US); Brian D. Gosch, Sioux Center, IA (US)

(73) Assignee: LINK MFG., LTD., Siouix Center, IA (US)

( * ) Notice: Subject to any disclaimer, the term of this patent is extended or adjusted under 35 U.S.C. 154(b) by 0 days.

(21) Appl. No.: 14/880,325

(22) Filed: Oct. 12, 2015

(51) Int. Cl.
*B62D 53/08* (2006.01)

(52) U.S. Cl.
CPC .................................. *B62D 53/0842* (2013.01)

(58) Field of Classification Search
CPC .................................................. B62D 53/0842
See application file for complete search history.

(56) References Cited

U.S. PATENT DOCUMENTS

| | | | | |
|---|---|---|---|---|
| 2,889,154 A | * | 6/1959 | De Lay | B60D 1/66 280/407 |
| 3,254,903 A | * | 6/1966 | Rodney | B62D 53/0814 280/407 |
| 3,770,296 A | * | 11/1973 | Logan | B62D 53/0842 280/407 |
| 3,834,736 A | * | 9/1974 | Dodgson | B62D 53/068 280/407 |
| 4,923,204 A | | 5/1990 | Henderson | |

FOREIGN PATENT DOCUMENTS

CA        1313892        8/1989

* cited by examiner

*Primary Examiner* — Kevin Hurley
(74) *Attorney, Agent, or Firm* — Dennis L. Thomte; Thomte Patent Law Office LLC

(57) ABSTRACT

An adjustable king pin assembly for a fifth wheel trailer which includes an adjustable slider bar having a king pin secured thereto. The slider bar and king pin are easily removed from the assembly for repair, maintenance or replacement.

10 Claims, 8 Drawing Sheets

ADJUSTABLE KING PIN ASSEMBLY

BACKGROUND OF THE INVENTION

1. Field of the Invention

This invention relates to a king pin assembly, and more particularly relates to a longitudinally adjustable king pin assembly of a fifth wheel trailer for attachment to the fifth wheel assembly on a tractor-trailer.

2. Description of the Related Art

Most large commercial transports include a tractor and a trailer attached to the tractor. The tractor consists of an engine, cab for the driver, transmission and drive wheels, and a "fifth wheel" which is a horizontal, flat circle with a pie-shaped wedge cut out of its rear-most portion. A downward pointing king pin at the front of a trailer slips into the pie-shaped opening in the fifth wheel and is clamped into position by the fifth wheel. The fifth wheel then bears the pulling load of the tractor and, as the trailer pin is cylindrical in shape, it allows the tractor to hinge at the pin-fifth wheel connection for turns.

Conventionally, the fifth wheel structure on a truck or tractor may be longitudinally adjustable on the tractor unit by means of, for example, an air pressured power pin mounted on the fifth wheel that fits into various slots on the deck of the tractor, allowing the fifth wheel to be moved forwards and backwards.

Several advantages arise if the king pin can be provided with a measure of longitudinal adjustment. For example, this would allow the driver of the vehicle to change the weights on the driving axles of the tractor and the forward-most set of wheels on the trailer, such that the driver might increase traction on the drive wheels when necessary.

As well, relative adjustment of the location of the king pin in the longitudinal direction permits the driver to also adjust the load on the trailer so that all of the axles on the tractor and trailer are of legal weight, rather than one being over legal weight and requiring either special permits or the payment of fines if no permit is available or if the weight is in excess of the permit.

Assignee's earlier U.S. Pat. No. 4,923,204 represented vast improvements in the adjustable king pin assembly art. In assignee's earlier U.S. Pat. No. 4,923,204, the slider bar and king pin thereof sometimes required repair or replacement, as in most king pin assemblies. The slider bar and king pin attached thereto were difficult to repair or replace in Assignee's earlier structure in that the structure required significant cutting and disassembly. The instant invention enables the slider bar and king pin structure to be easily removed from the assembly for repair and/or replacement thereof.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An adjustable king pin assembly for a fifth wheel trailer having a forward end, a rearward end, a first side and a second side, is described. A bolster plate having a longitudinally extending slot, having forward and rearward ends, is formed therein which extends rearwardly from the forward end of the bolster plate. The bolster plate is secured to the forward end of the fifth wheel trailer. An elongated and longitudinally extending inverted channel member, having forward and rearward ends, is secured to the upper side of the bolster plate above the slot in the bolster plate. The inverted channel member includes a base portion and downwardly extending side portions with the side portions having lower ends. The lower ends of the side portions of the inverted channel member are either directly secured to the upper side of the bolster plate or are operatively connected to the bolster plate.

An upstanding and generally cylindrical locking pin support collar, having upper and lower ends, is secured to the base portion of the inverted channel member and extends upwardly therefrom. The inverted channel member has an opening formed in the base portion thereof which registers with the locking pin support collar. A locking pin, having upper and lower ends, is vertically movably positioned in the locking pin support collar and which is selectively movable between upper and lower positions with respect to the inverted channel member. The locking pin, when in its upper position, has its lower end dwelling in a plane whereby the lower end thereof does not extend downwardly from the opening in the base portion of the inverted channel member. The locking pin, when in its lower position, has its lower end dwelling in a plane below the base portion of the inverted channel member. Means is provided for moving the locking pin from its upper position to its lower position and for moving the locking pin from its lower position to its upper position.

The assembly also includes an elongated and generally flat slider bar having forward and rearward ends with the slider bar having a king pin secured thereto which extends downwardly therefrom at the forward end thereof with the king pin extending downwardly through the slot in the bolster plate. The slider bar has a plurality of spaced-apart locking pin openings formed therein rearwardly of the king pin. The slider bar is selectively longitudinally slidably received in the inverted channel member. The locking pin openings in the slider bar are configured to selectively receive the lower end of the locking pin therein to lock the slider bar in various positions with respect to the inverted channel member.

A service plug is selectively removably received in and secured to the forward end of the inverted channel member which is configured to prevent the slider bar from moving out of the inverted channel member when secured in the forward end of the inverted channel member and to permit the slider bar and the king pin thereon to be removed to service or replace the same when the service plug is removed from the forward end of the inverted channel member.

In the preferred embodiment, the means for moving the locking pin from its upper position to its lower position comprises an actuator operatively connected to the locking pin. The actuator may either be an air actuator or an electric actuator. In the preferred embodiment, the adjustable king pin assembly includes a pair of springs which are operatively connected to the locking pin for urging the locking pin from its upper position to its lower position when the actuator is deactivated.

It is therefore a principal object of the invention to provide an improved adjustable king pin assembly for a fifth wheel trailer.

A further object of the invention is to provide an adjustable king pin assembly for a fifth wheel trailer wherein the king pin and the slider bar to which is connected may be easily removed from the assembly for service or replacement.

A further object of the invention is to provide an adjustable king pin assembly for a fifth wheel trailer which allows the driver of the tractor to adjust the trailer king pin position on a fully loaded, connected trailer without having to disconnect the king pin from the fifth wheel.

A further object of the invention is to provide an adjustable king pin assembly for a fifth wheel trailer whereby the overall length of the tractor/trailer unit may be adjusted so that the axle weight distribution can be optimized for particular load configurations and road conditions, thereby maximizing pay load and improving traction.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
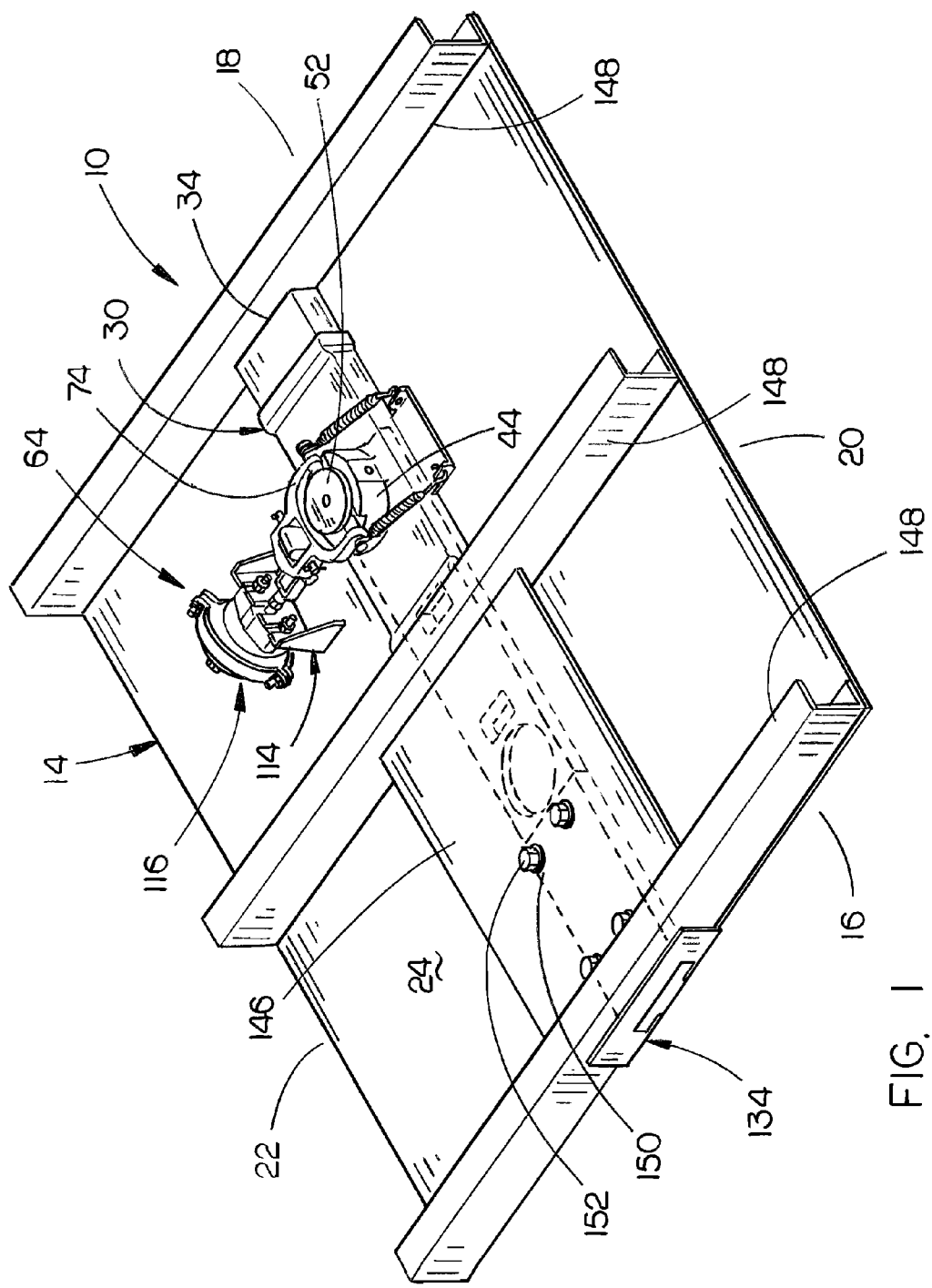
FIG. 1 is an upper perspective view of the adjustable king pin assembly of this invention.
Figure 2:
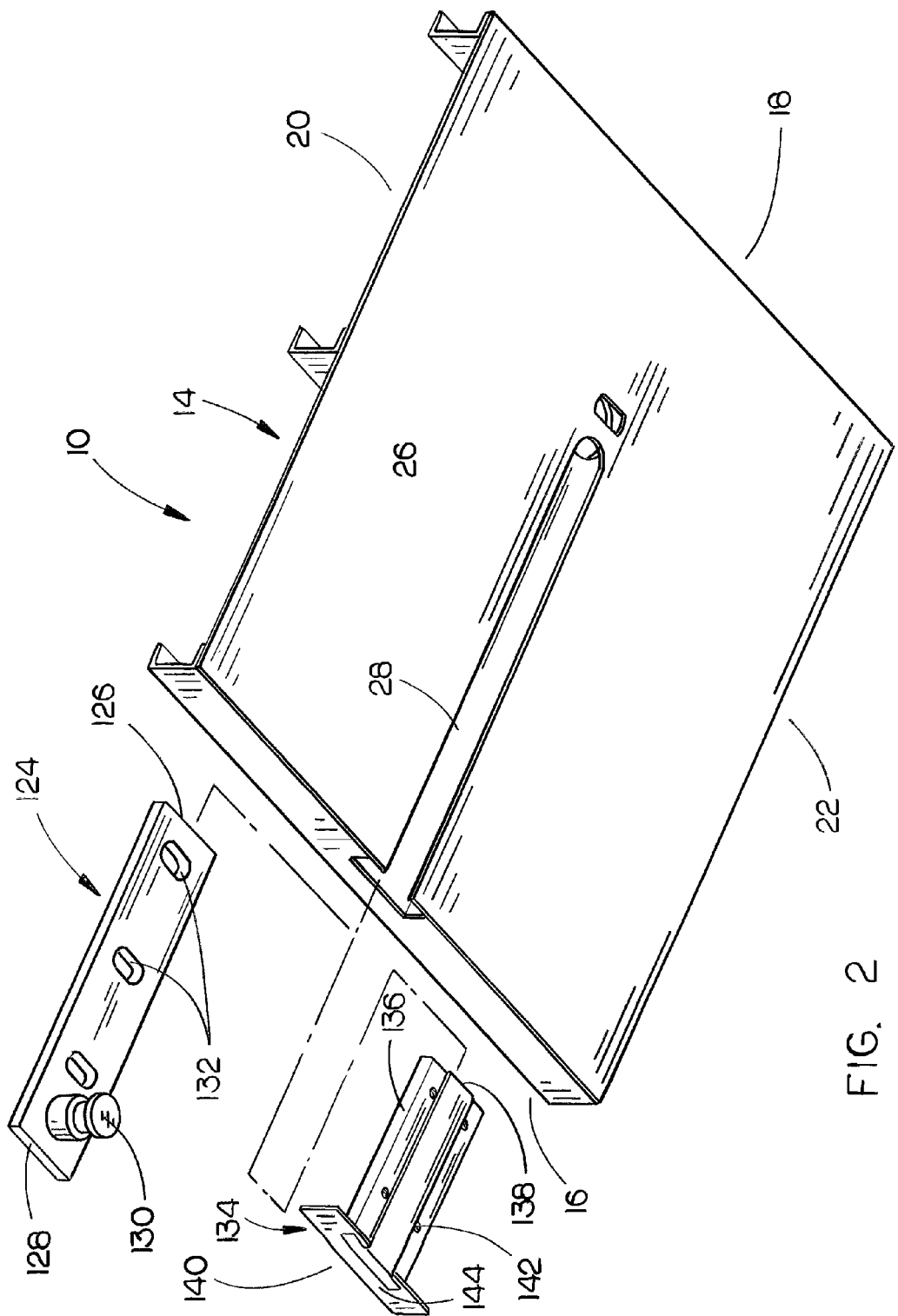
FIG. 2 is a partial lower exploded perspective view of the adjustable king pin assembly of this invention.
Figure 3:
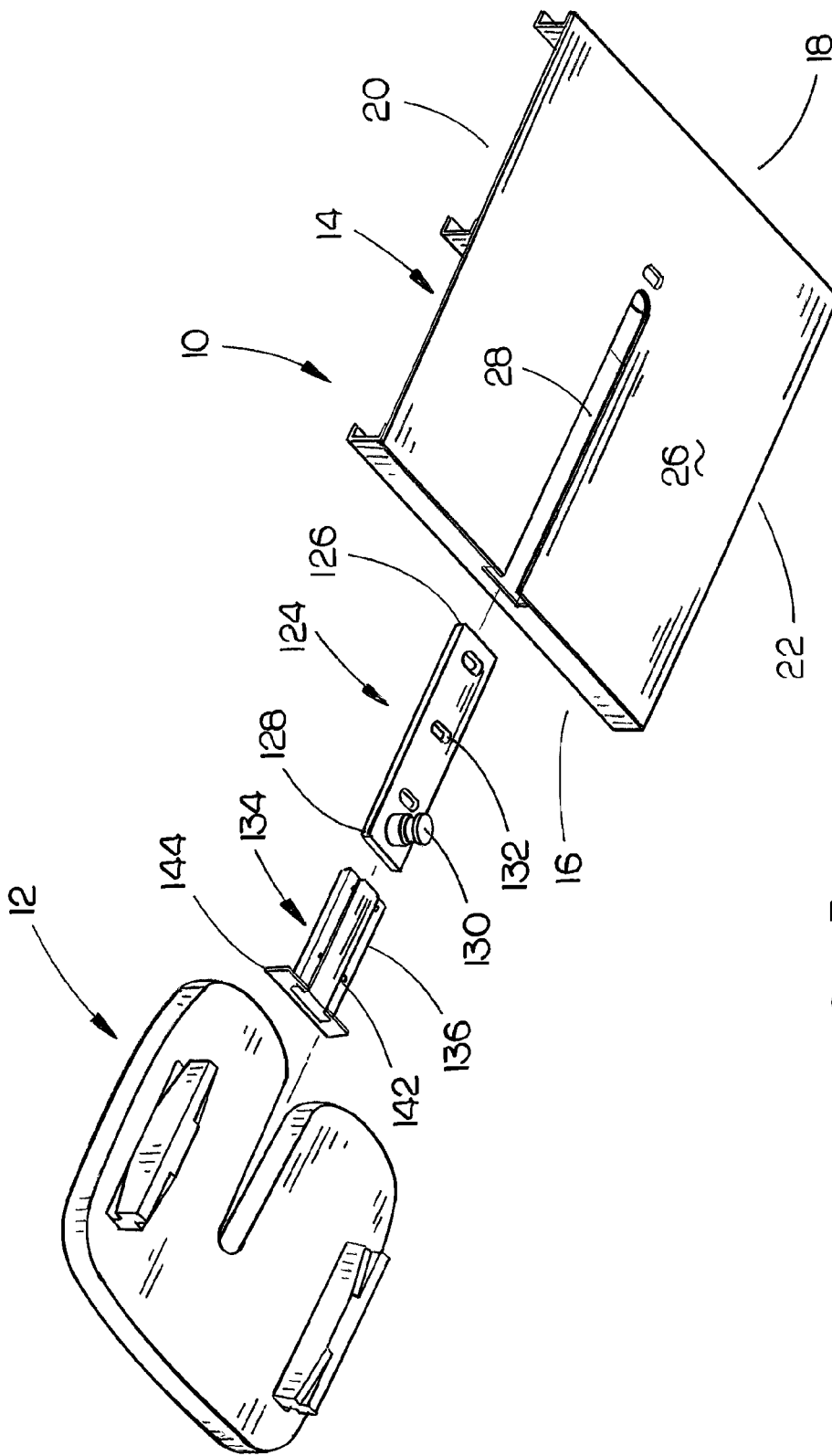
FIG. 3 is a partial lower exploded perspective view of the adjustable king pin assembly of this invention and a tractor fifth wheel to which the king pin assembly of this invention is attached.
Figure 4:
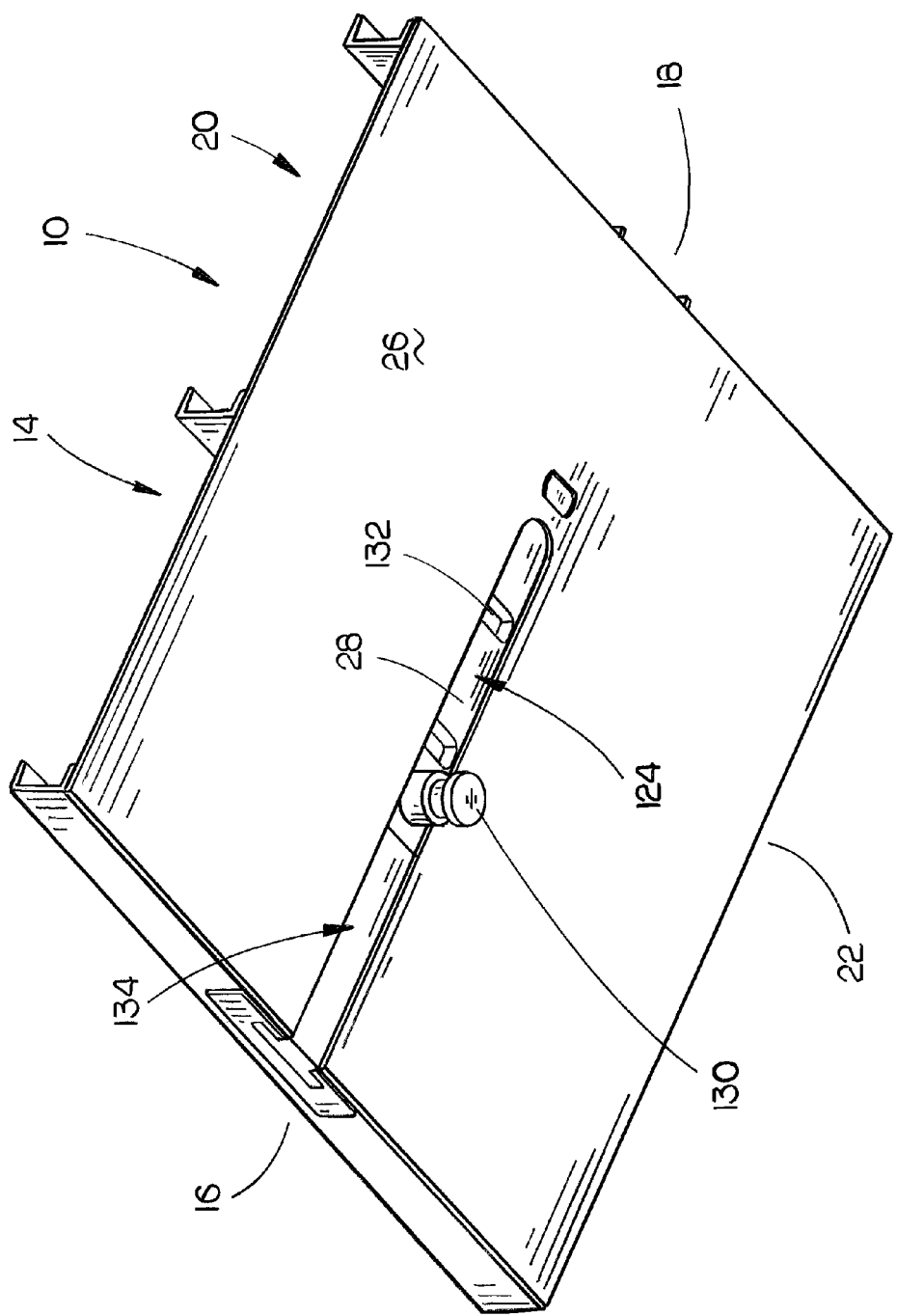
FIG. 4 is a lower perspective view of the adjustable king pin assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the adjustable king pin assembly of this invention which is designed to be secured to the forward end of a fifth wheel trailer so that a tractor with a fifth wheel hitch assembly 12 of conventional design may be connected to the trailer.

Assembly 10 includes a bolster plate 14 which is secured by welding or the like to the forward end of the trailer. Bolster plate 14 is designed to have various lengths, widths, etc., depending on the trailer manufacturer. The bolster plate 14 will be described as having a forward end 16, a rearward end 18, a first side 20, a second side 22, an upper side 24, and a lower side 26. Bolster plate 14 will usually be comprised of a metal material such as steel. Bolster plate 14 will be positioned on the lower fifth wheel plate 12 mounted on the tractor with the lower fifth wheel plate 12 on the tractor designed to receive the trailer king pin therein and locked therein. The bolster plate 14 has an elongated slot 28 formed therein which extends rearwardly from the forward end 16 thereof.

The numeral 30 refers to an elongated and longitudinally extending and inverted channel member having a forward end (not shown) and a rearward end 34. Channel member 30 includes a base member 36, and opposite side walls 38 and 40. The lower ends of side walls 38 and 40 are welded or otherwise secured to the upper side 24 of bolster plate 14. The length of channel member 30 will vary depending on the trailer manufacturer's specifications.

Base member 36 of channel member 30 has an opening 42 formed therein. A locking pin collar or sleeve 44 extends upwardly from base member 36 with the lower end thereof registering with opening 42. End side of locking pin collar 44 has an internally threaded bore 46 formed therein adapted to receive a key, screw or bolt 47 therein. The upper end of collar 44 has slots 48 and 50 formed therein at the forward and rearward ends thereof.

Locking pin collar 44 is configured to vertically slidably receive a locking pin 52 having an upper end 54 and a lower end 56. The side wall 58 of locking pin 52 has a vertical slot or keyway 60 formed therein. Locking pin 52 also has a ring-shaped groove 62 formed therein below its upper end. As seen, the lower end 56 of locking pin has a generally rectangular shape. The shape of the lower end 56 may vary somewhat.

Figure 5:
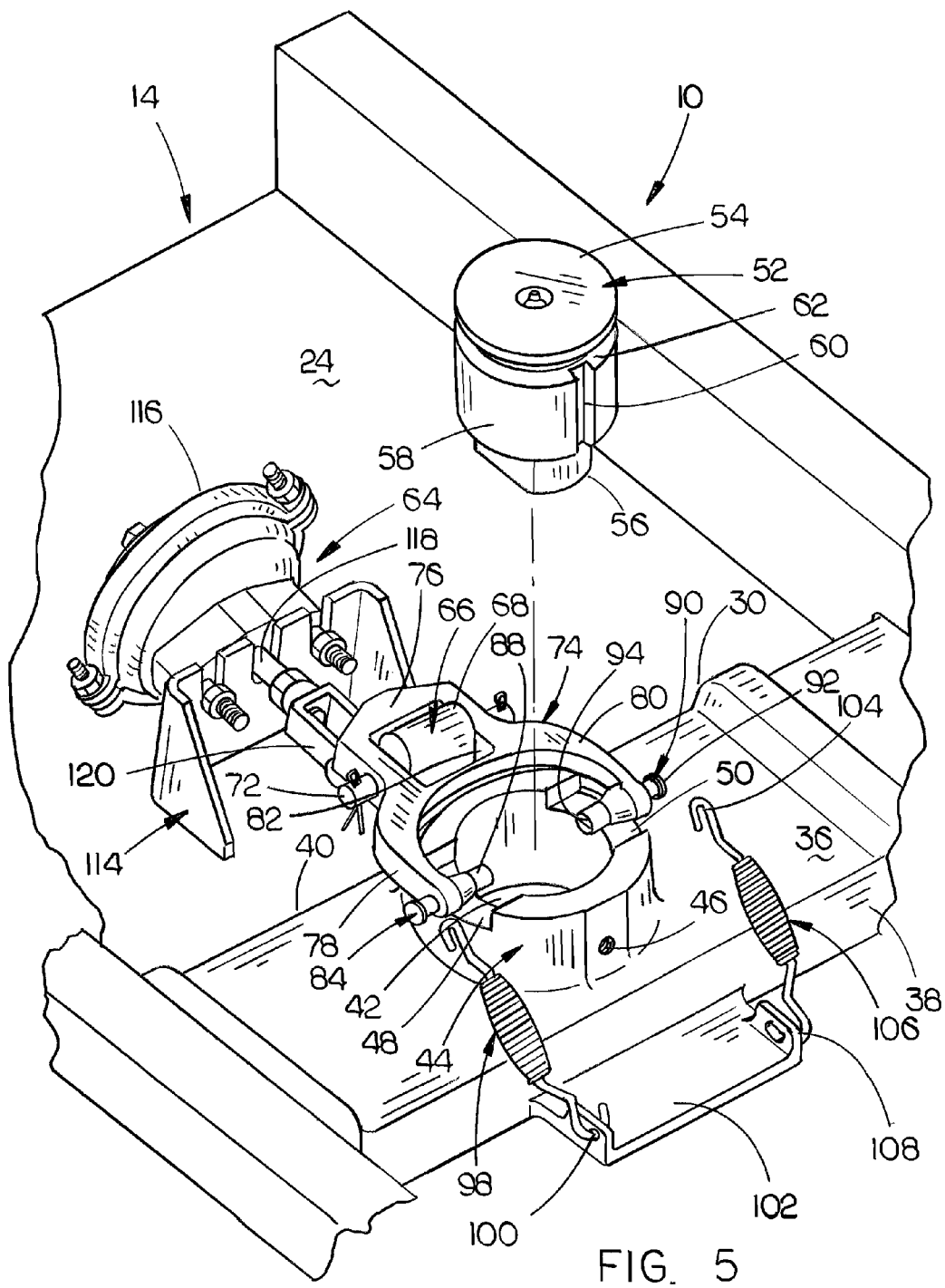
FIG. 5 is a partial perspective view of the structure of this invention which is provided to raise and lower the locking pin thereof.
Figure 6:
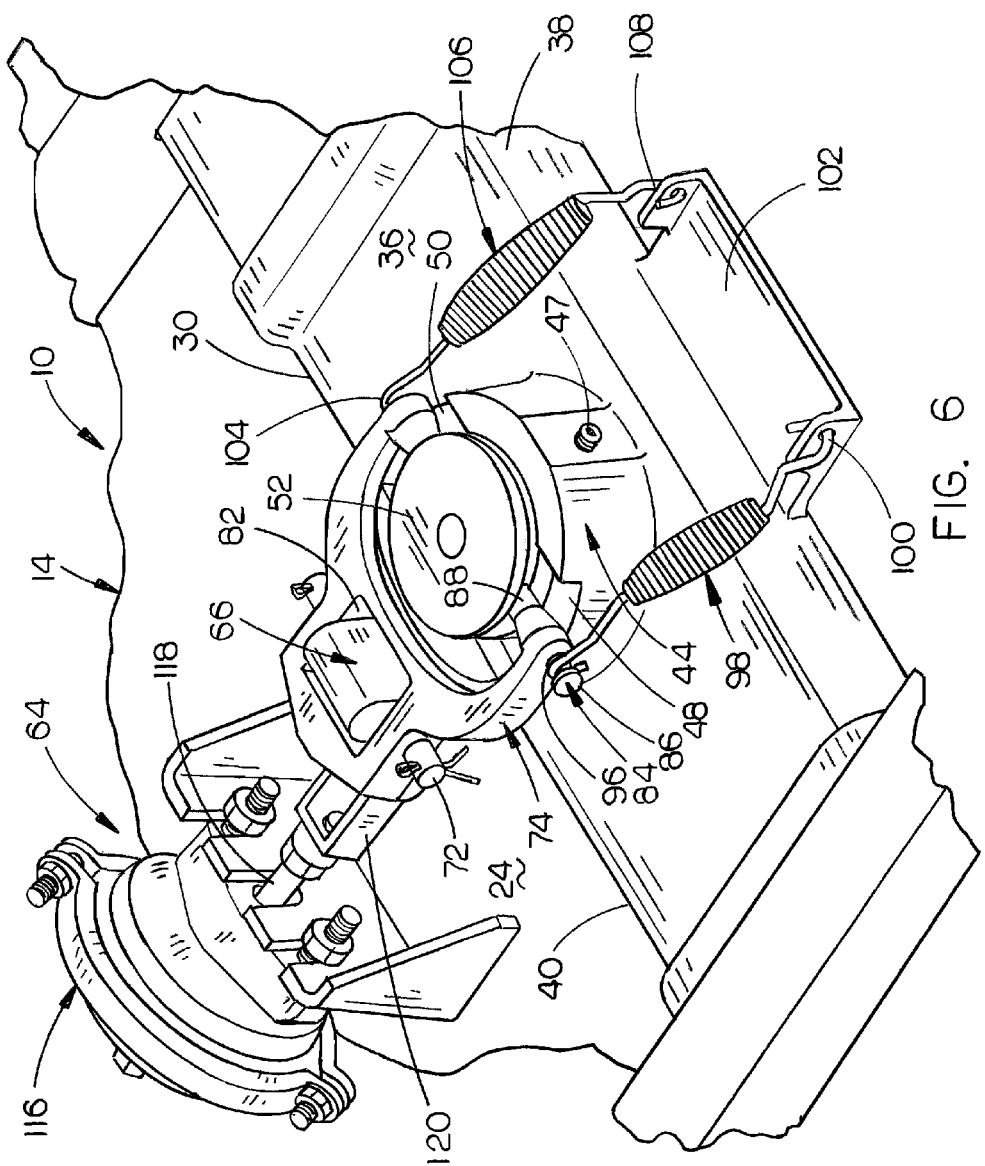
FIG. 6 is a partial perspective view illustrating the locking pin thereof in its lower locking position.
Figure 7:
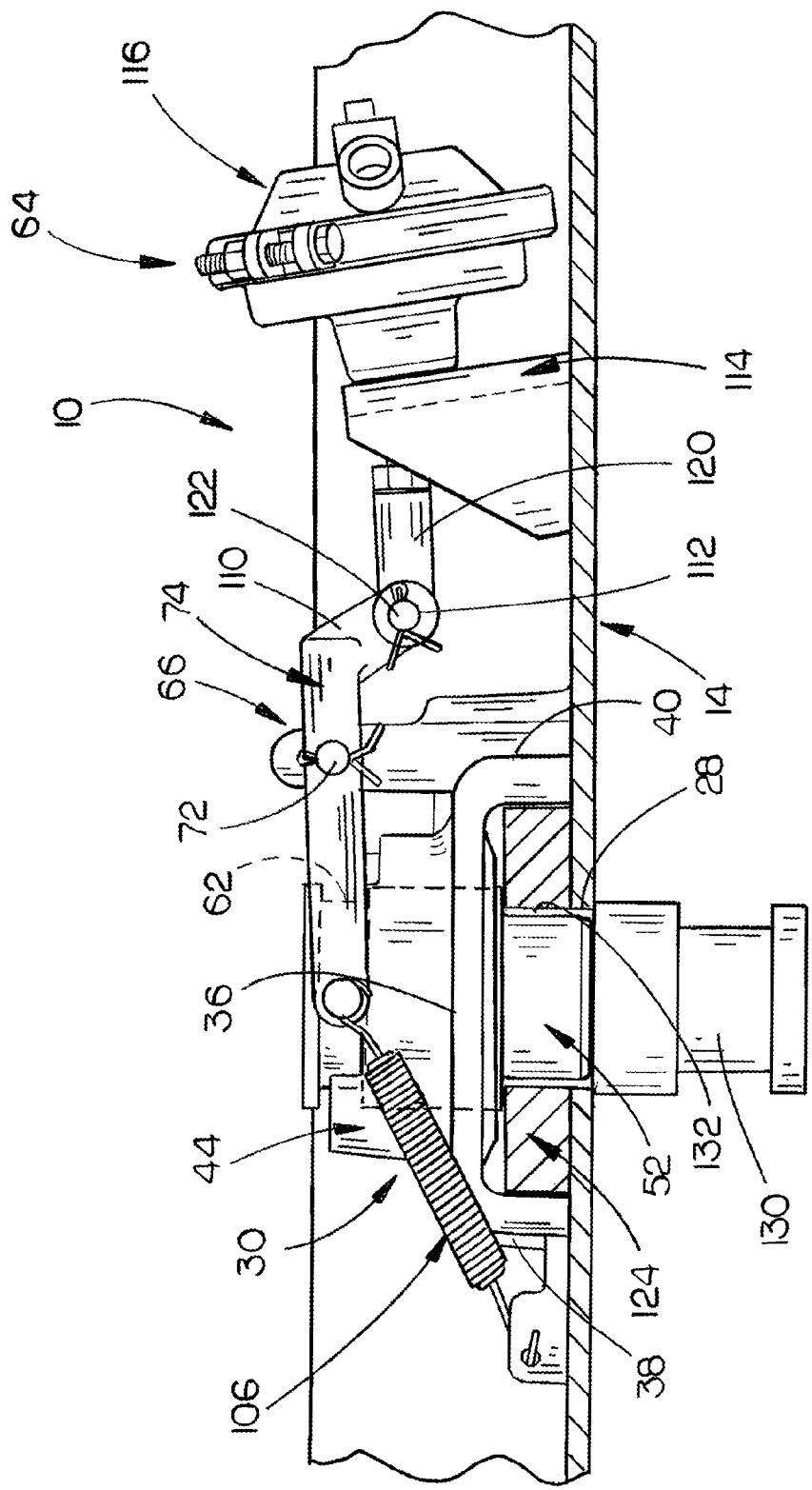
FIG. 7 is a partial sectional view illustrating the locking pin of this invention in its lower locking position.

The numeral 64 refers to a locking pin actuator assembly. Assembly 64 includes an upstanding post 66 which is cast with the channel member 30 at one side thereof and which has an upper end 68. A pivot pin opening is formed in post 66 below the upper end thereof adapted to receive pivot pin 72. Assembly 64 also includes a horizontally disposed yoke 74 which is pivotally secured to post 68 by pin 72. Yoke 74 includes a base portion 76 and semi-circular legs or arms 78 and 80 which extend therefrom as seen in FIG. 5. Base portion 76 has an opening 82 formed therein which receives post 66.

A pin or post 84 is mounted in the free end of leg 78 and has outer and inner ends 86 and 88 respectively. A pin or post 90 is mounted in the free end of leg 80 and has outer and inner ends 92 and 94 respectively. The inner end 88 of pin or post 84 extends through slot 48 and is received in groove 62 of locking pin 52 and the inner end 94 of pin or post 90 is received in groove 62 of locking pin 52. The upper end 96 of spring 98 is secured to the outer end 86 of pin or post 84 and has its lower end 100 secured to a bracket 102 which is secured to channel member 30. The upper end 104 of spring 106 is secured to the outer end 92 of pin or post 90 and has its lower end 108 secured to the bracket 102.

As seen in the drawings, the base portion 76 of yoke 74 has an actuator arm 110 fixed thereto which extends downwardly therefrom and which has a pivot pin opening 112 formed therein. The numeral 114 refers to a bracket which is secured to bolster plate 14. A conventional spring-loaded air actuator 116 is mounted on bracket 114 and is connected to the air system of the tractor. Actuator 116 could be an electrical actuator or hydraulic actuator if so desired. Actuator 116 includes an actuator rod 118 extending therefrom. A yoke 120 is connected to the outer end of rod 118 as seen in the drawings. Yoke 120 is pivotally secured to arm 110 by a pin 122 extending through pivot pin opening 112 in arm 110.

Thus, extension of actuator rod 118 causes the free ends of legs 78 and 80 of yoke 74 to move upwardly so that locking pin 52 is moved from its lower position to its upper position as will be described in greater detail hereinafter. As the legs 78 and 80 are moved upwardly, the springs 98 and 106 are tensioned. When the actuator 116 is deactivated, the springs 98 and 106 cause the legs 78 and 80 to move downwardly so that locking pin 52 moves to its lower locking position.

The numeral 124 refers to an elongated, flat slider bar having an inner end 126 and an outer end 128. A king pin 130 is secured to slider bar 124 adjacent outer end 128 and extends downwardly therefrom. A plurality of spaced-apart locking pin openings 132 are formed in slider bar 124. Although the drawings illustrate three locking pin openings 132, slider bar 124 could have additional openings 132 formed therein. The length of slider bar 124 will vary depending upon the specifications of the trailer manufacturer. Slider bar 124 is longitudinally slidably mounted within the inverted channel member 30 with king pin 130 extending downwardly through slot 28 in bolster plate 14.

The numeral 134 refers to a service plug which includes a flat bar portion 136 having an inner end 138 and an outer end 140. Bar portion 136 has a plurality of internally threaded bolt openings 142 formed therein. Plate 144 is secured to the outer end of bar portion 136. Bar portion 136 is slidably received in the outer end of channel member 30.

A plate 146 is secured to a pair of frame members 148 which form a part of the trailer frame at the forward end of the trailer. As seen, plate 146 is spaced above bolster plate 14. Plate 146 has a plurality of spaced-apart bolt openings 150 formed therein which register with bolt openings 142 in bar portion 136 of service plug 134 when bar portion 136 is mounted in channel member 30. Bolts 152 extend downwardly through bolt openings 150 in plate 146 and are threadably received in bolt openings 142 in service plug 134 to close the outer end of channel member 30.

Figure 8:
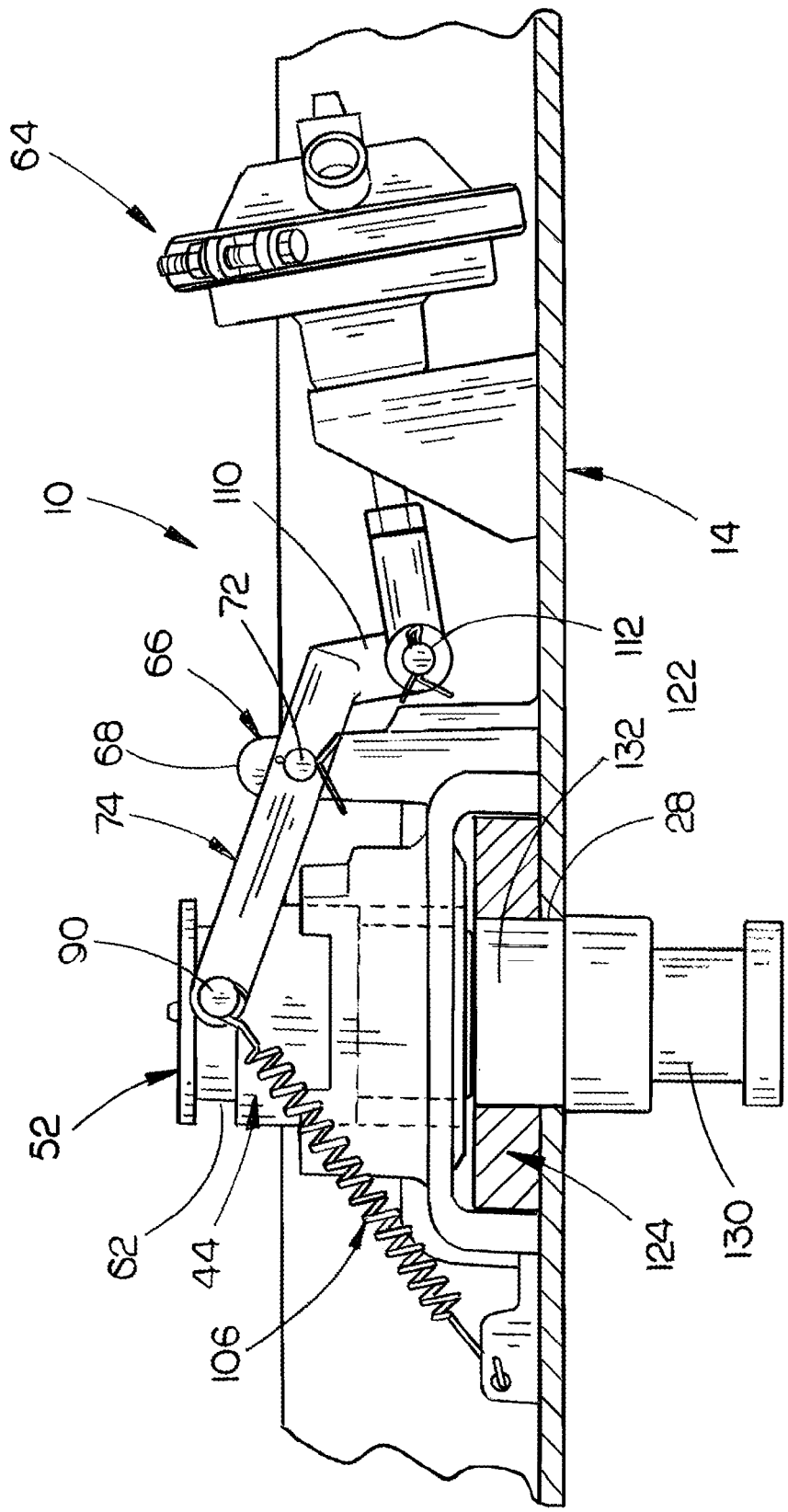
FIG. 8 is a partial sectional view illustrating the locking pin of this invention in its upper unlocked position.

The adjustable king pin assembly 10 is initially placed into position for use as will now be described. The actuator 116 will be operated to raise locking pin 52 to its upper position as seen in FIG. 8. Slider bar 124 is then inserted into the outer end of channel member 30 with king pin 130 extending downwardly through slot 28 in bolster plate 14. The service plug 134 is then inserted into the outer end of channel member 30. The bolts 152 are then inserted downwardly through bolt openings 150 and threadably secured to the bolt openings 142.

The actuator 116 will then be deactivated so that the actuator rod 118 is then withdrawn into actuator 110 so that the locking pin 52 is lowered to its lower position due to the spring in the actuator 116 and the springs 98 and 106. The slider bar 124 will then usually be manually moved until the lower end of locking pin 52 is able to move downwardly into one of the desired slots 132 in slider bar 124. The tractor is then connected to the trailer by the king pin 130 being secured to the fifth wheel structure of the tractor.

If the driver wishes to change the position of the slider bar 124 and the king pin 130 with respect to the fifth wheel structure, the brakes of the trailer are locked. The actuator 116 is then activated to raise the locking pin 52 out of its engagement with one of the slots 132. The tractor is then moved forwardly or rearwardly with respect to the trailer until the locking pin 52 is positioned over the selected slot 132. The actuator 116 is then deactivated so that the locking pin 52 is received by the selected slot 132. If the king pin 130 or the slider bar 124 require maintenance or repair, the trailer is disconnected from the tractor. The service plug 134 is then removed and the slider bar 124 is removed from channel member 30. The slider bar 124 and king pin 130 may then be easily repaired or replaced.

Although it is preferred that the slot 28 extend rearwardly into the bolster plate 14, the slot 28 may be formed in bolster plate 14 so as to extend forwardly into the rearward end of bolster plate 14. In that case, the slider bar 124 will extend into slot 28 and channel member 30 from the rearward end thereof and the service plug 134 will be positioned in the rearward end of channel member 30 and the slot 28.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. An adjustable king pin assembly for a fifth wheel trailer having a forward end, a rearward end, a first side and a second side, comprising:

a bolster plate having an upper side, a lower side, a forward end, a rearward end, a first side and a second side;

said bolster plate having a longitudinally extending slot, having forward and rearward ends, formed therein which extends rearwardly thereinto from said forward end of said bolster plate;

said bolster plate being secured to the forward end of the fifth wheel trailer;

an elongated, longitudinally extending and inverted channel member, having forward and rearward ends, secured to said upper side of said bolster plate above said slot in said bolster plate;

said inverted channel member including a base portion and downwardly extending side portions with said side portions having lower ends;

said lower ends of said side portions of said inverted channel member being operatively secured to said upper side of said bolster plate;

an upstanding and generally cylindrical locking pin support collar, having upper and lower ends, secured to said base portion of said inverted channel member and which extends upwardly therefrom;

said inverted channel member having an opening formed in said base portion thereof which registers with said locking pin support collar;

a locking pin, having upper and lower ends, vertically movably positioned in said locking pin support collar and which is selectively movable between upper and lower positions with respect to said locking pin support collar and said inverted channel member;

said locking pin, when in said upper position, having its said lower end dwelling in a plane whereby said lower end thereof does not extend downwardly from said opening in said base portion of said inverted channel member;

said locking pin, when in said lower portion, having its said lower end dwelling in a plane below said base portion of said inverted channel member;

means for moving said locking pin from its said upper position to its said lower position and for moving said locking pin form its said lower position to its said upper position;

an elongated, longitudinally extending and generally flat slider bar having forward and rearward ends;

said slider bar having a king pin secured thereto which extends downwardly therefrom with said king pin extending downwardly through said slot in said bolster plate;

said slider bar having a plurality of spaced-apart openings formed therein;

said slider bar being selectively slidably received in said inverted channel member;

said locking pin openings in said slider bar configured to selectively receive said lower end of said locking pin therein to lock said slider bar in various positions in said inverted channel member; and a service plug selectively removably received in and secured to said forward end of said inverted channel member configured to prevent said slider bar from moving out of said inverted channel member when secured in said forward end of said inverted channel member and permitting said slider bar and said king pin to be removed from said inverted channel member to service or replace the same when said service plug is removed from said forward end of said inverted channel member.

2. The adjustable king pin assembly of claim 1 wherein said means for moving said locking pin from its said upper position to its said lower position comprises an actuator operatively connected to said locking pin.

3. The adjustable king pin assembly of claim 2 wherein said actuator comprises an air actuator.

4. The adjustable king pin assembly of claim 2 wherein at least one spring is operatively connected to said locking pin for urging said locking pin from its said upper position to its said lower position.

5. The adjustable king pin assembly of claim 1 wherein said service plug is selectively operatively bolted to said bolster plate.

6. An adjustable king pin assembly for a fifth wheel trailer having a forward end, a rearward end, a first side and a second side, comprising:

a bolster plate having an upper side, a lower side, a forward end, a rearward end, a first side and a second side;

said bolster plate having a longitudinally extending slot, having forward and rearward ends, formed therein which extends forwardly thereinto from said rearward end of said bolster plate;

said bolster plate being secured to said forward end of the fifth wheel trailer;

an elongated, longitudinally extending and inverted channel member, having forward and rearward ends, secured to said upper side of said bolster plate above said slot in said bolster plate;

said inverted channel member including a base portion and downwardly extending side portions with said side portions having lower ends;

said lower ends of said side portions of said inverted channel member being operatively secured to said upper side of said bolster plate;

an upstanding and generally cylindrical locking pin support collar, having upper and lower ends, secured to said base portion of said inverted channel member and which extends upwardly therefrom;

said inverted channel member having an opening formed in said base portion thereof which registers with said locking pin support collar;

a locking pin, having upper and lower ends, vertically movably positioned in said locking pin support collar and which is selectively movable between upper and lower positions with respect to said locking pin support collar and said inverted channel member;

said locking pin, when in said upper position, having its said lower end dwelling in a plane whereby said lower end thereof does not extend downwardly from said opening in said base portion of said inverted channel member;

said locking pin, when in said lower portion, having its said lower end dwelling in a plane below said base portion of said inverted channel member;

means for moving said locking pin from its said upper position to its said lower position and for moving said locking pin form its said lower position to its said upper position;

an elongated, longitudinally extending and generally flat slider bar having forward and rearward ends;

said slider bar having a king pin secured thereto which extends downwardly therefrom with said king pin extending downwardly through said slot in said bolster plate;

said slider bar having a plurality of spaced-apart openings formed therein;

said slider bar being selectively slidably received in said inverted channel member;

said locking pin openings in said slider bar configured to selectively receive said lower end of said locking pin therein to lock said slider bar in various positions in said inverted channel member; and a service plug selectively removably received in and secured to said rearward end of said inverted channel member configured to prevent said slider bar from moving out of said inverted channel member when secured in said rearward end of said inverted channel member and permitting said slider bar and said king pin to be removed from said inverted channel member to service or replace the same when said service plug is removed from said forward end of said inverted channel member.

7. The adjustable king pin assembly of claim 6 wherein said means for moving said locking pin from its said upper position to its said lower position comprises an actuator operatively connected to said locking pin.

8. The adjustable king pin assembly of claim 7 wherein said actuator comprises an air actuator.

9. The adjustable king pin assembly of claim 7 wherein at least one spring is operatively connected to said locking pin for urging said locking pin from its said upper position to its said lower position.

10. The adjustable king pin assembly of claim 6 wherein said service plug is selectively operatively bolted to said bolster plate.

* * * * *